United States Patent
O'Neill (10) Patent No.: US 9,131,367 B2
(45) Date of Patent: *Sep. 8, 2015

(54) SUPPORT OF DISPARATE ADDRESSING PLANS AND DYNAMIC HA ADDRESS ALLOCATION IN MOBILE IP

(71) Applicant: QUALCOMM Incorporated, San Diego, CA (US)

(72) Inventor: Alan O'Neill, Henley Beach, SA (AU)

(73) Assignee: QUALCOMM Incorporated, San Diego, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 14/047,116

(22) Filed: Oct. 7, 2013

(65) Prior Publication Data

US 2014/0036871 A1    Feb. 6, 2014

Related U.S. Application Data

(63) Continuation of application No. 12/099,026, filed on Apr. 7, 2008, now Pat. No. 8,559,411, which is a continuation of application No. 10/408,726, filed on Apr. 7, 2003, now Pat. No. 7,356,020.

(60) Provisional application No. 60/370,836, filed on Apr. 8, 2002.

(51) Int. Cl.
*H04J 3/24*     (2006.01)
*H04L 12/28*    (2006.01)
(Continued)

(52) U.S. Cl.
CPC    *H04W 8/26* (2013.01); *H04W 8/08* (2013.01); *H04W 8/085* (2013.01);
(Continued)

(58) Field of Classification Search
CPC .................................................. H04W 80/04
See application file for complete search history.

(56) References Cited

U.S. PATENT DOCUMENTS 4,679,244 A    7/1987  Kawasaki et al.
4,833,701 A    5/1989  Comroe et al.
(Continued)

FOREIGN PATENT DOCUMENTS

EP    1207645 A1    5/2002
EP    1244261 A2    9/2002
(Continued)

OTHER PUBLICATIONS

Baker, F., IETF, "RSVP Management Information Base Using SMIv2," Network Working Group, Request for Comments: 2206, pp. 1-64 (Sep. 1997).
(Continued)

*Primary Examiner* — Samina Choudhry
(74) *Attorney, Agent, or Firm* — Michael F. Taveira (57) ABSTRACT

Methods and apparatus for enhancing Mobile IP signaling and to support use of disparate addressing plans and dynamic Home Agent allocation in Mobile IP Regional Tunneling are described. The enhanced methods of signaling use an intermediate node, e.g., a Gateway Foreign Agent, straddling different addressing domains, when the signaling controls a process between the intermediate node and an upstream node. The specific intermediate node, its interfaces and upstream addresses can be dynamically selected. The Enhanced MIP signaling includes dynamic allocation of: a regional node at a Foreign Agent, the upstream address of a regional node by the regional node, a Home Agent for a regional node prior to dynamic allocation of the regional node. A method is supported to indicate to a Mobile Node that a dynamically allocated regional node has become invalid triggering enhanced MIP signaling dynamically allocating a new regional node and upstream interface address.

22 Claims, 5 Drawing Sheets

(51) Int. Cl.
*H04W 8/26* (2009.01)
*H04W 8/08* (2009.01)
*H04L 29/12* (2006.01)
*H04W 8/06* (2009.01)
*H04W 80/04* (2009.01)
*H04W 88/16* (2009.01)

(52) U.S. Cl.
CPC ...... *H04L 29/12349* (2013.01); *H04L 61/2507* (2013.01); *H04W 8/065* (2013.01); *H04W 80/04* (2013.01); *H04W 88/16* (2013.01)

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,095,529 A | 3/1992 | Comroe et al. |
| 5,128,938 A | 7/1992 | Borras |
| 5,200,952 A | 4/1993 | Bernstein et al. |
| 5,210,787 A | 5/1993 | Hayes et al. |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,325,432 A | 6/1994 | Gardeck et al. |
| 5,369,781 A | 11/1994 | Comroe et al. |
| 5,387,905 A | 2/1995 | Grube et al. |
| 5,420,909 A | 5/1995 | Ng et al. |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'dea et al. |
| 5,513,381 A | 4/1996 | Sasuta |
| 5,542,108 A | 7/1996 | Sasuta |
| 5,566,366 A | 10/1996 | Russo et al. |
| 5,572,528 A | 11/1996 | Shuen |
| 5,590,396 A | 12/1996 | Henry |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,806,007 A | 9/1998 | Raith et al. |
| 5,884,196 A | 3/1999 | Lekven et al. |
| 5,898,922 A | 4/1999 | Reininghaus |
| 5,901,362 A | 5/1999 | Cheung et al. |
| 5,903,559 A | 5/1999 | Acharya et al. |
| 5,987,323 A | 11/1999 | Huotari |
| 6,011,969 A | 1/2000 | Vargas et al. |
| 6,021,123 A | 2/2000 | Mimura |
| 6,021,326 A | 2/2000 | Nguyen |
| 6,055,236 A | 4/2000 | Nessett et al. |
| 6,078,575 A | 6/2000 | Dommety et al. |
| 6,092,111 A | 7/2000 | Scivier et al. |
| 6,134,226 A | 10/2000 | Reed et al. |
| 6,144,671 A | 11/2000 | Perinpanathan et al. |
| 6,160,798 A | 12/2000 | Reed et al. |
| 6,161,008 A | 12/2000 | Lee et al. |
| 6,195,705 B1 | 2/2001 | Leung |
| 6,225,888 B1 | 5/2001 | Juopperi |
| 6,256,300 B1 | 7/2001 | Ahmed et al. |
| 6,275,712 B1 | 8/2001 | Gray et al. |
| 6,308,080 B1 | 10/2001 | Burt et al. |
| 6,308,267 B1 | 10/2001 | Gremmelmaier |
| 6,353,616 B1 | 3/2002 | Elwalid et al. |
| 6,366,561 B1 | 4/2002 | Bender |
| 6,366,577 B1 | 4/2002 | Donovan |
| 6,400,703 B1 | 6/2002 | Park et al. |
| 6,400,722 B1 | 6/2002 | Chuah et al. |
| 6,434,134 B1 | 8/2002 | La Porta et al. |
| 6,445,922 B1 | 9/2002 | Hiller et al. |
| 6,446,127 B1 | 9/2002 | Schuster et al. |
| 6,466,964 B1 | 10/2002 | Leung et al. |
| 6,477,150 B1 | 11/2002 | Maggenti et al. |
| 6,487,170 B1 | 11/2002 | Chen et al. |
| 6,487,407 B2 | 11/2002 | Goldberg et al. |
| 6,496,505 B2 | 12/2002 | La Porta et al. |
| 6,498,934 B1 | 12/2002 | Muller |
| 6,505,047 B1 | 1/2003 | Palkisto |
| 6,510,144 B1 | 1/2003 | Dommety et al. |
| 6,510,153 B1 | 1/2003 | Inoue et al. |
| 6,519,254 B1 | 2/2003 | Chuah et al. |
| 6,539,225 B1 | 3/2003 | Lee |
| 6,546,252 B1 | 4/2003 | Jetzek et al. |
| 6,563,919 B1 | 5/2003 | Aravamudhan et al. |
| 6,567,416 B1 | 5/2003 | Chuah |
| 6,567,664 B1 | 5/2003 | Bergenwall et al. |
| 6,571,095 B1 | 5/2003 | Koodli |
| 6,571,289 B1 | 5/2003 | Montenegro |
| 6,578,085 B1 | 6/2003 | Khalil et al. |
| 6,584,093 B1 | 6/2003 | Salama et al. |
| 6,611,506 B1 | 8/2003 | Huang et al. |
| 6,611,547 B1 | 8/2003 | Rauhala |
| 6,615,236 B2 | 9/2003 | Donovan et al. |
| 6,631,122 B1 | 10/2003 | Arunachalam et al. |
| 6,636,498 B1 | 10/2003 | Leung |
| 6,650,901 B1 | 11/2003 | Schuster et al. |
| 6,654,363 B1 | 11/2003 | Li et al. |
| 6,678,735 B1 | 1/2004 | Orton et al. |
| 6,680,943 B1 | 1/2004 | Gibson et al. |
| 6,690,936 B1 | 2/2004 | Lundh |
| 6,738,362 B1 | 5/2004 | Xu et al. |
| 6,763,007 B1 | 7/2004 | La Porta et al. |
| 6,992,994 B2 | 1/2006 | Das et al. |
| 7,050,457 B2 | 5/2006 | Erfurt |
| 7,167,466 B2 | 1/2007 | Chowdhury et al. |
| 7,356,020 B2 | 4/2008 | O'neill |
| 8,559,411 B2 | 10/2013 | O'Neill |
| 2001/0036164 A1 | 11/2001 | Kakemizu et al. |
| 2001/0041571 A1 | 11/2001 | Yuan |
| 2001/0046223 A1 | 11/2001 | Malki et al. |
| 2002/0015396 A1 | 2/2002 | Jung |
| 2002/0018456 A1 | 2/2002 | Kakemizu et al. |
| 2002/0026527 A1 | 2/2002 | Das et al. |
| 2002/0068565 A1 | 6/2002 | Purnadi et al. |
| 2002/0071417 A1 | 6/2002 | Nakatsugawa et al. |
| 2002/0089958 A1 | 7/2002 | Feder et al. |
| 2002/0114469 A1 | 8/2002 | Faccin et al. |
| 2002/0136226 A1 | 9/2002 | Christoffel et al. |
| 2002/0161927 A1 | 10/2002 | Inoue et al. |
| 2002/0186679 A1 | 12/2002 | Nakatsugawa et al. |
| 2002/0191593 A1 | 12/2002 | ONeill et al. |
| 2003/0007417 A1 | 1/2003 | Miyata et al. |
| 2003/0012179 A1 | 1/2003 | Yano et al. |
| 2003/0018810 A1 | 1/2003 | Karagiannis et al. |
| 2003/0051140 A1 | 3/2003 | Buddhikot et al. |
| 2003/0060199 A1 | 3/2003 | Khalil et al. |
| 2003/0117969 A1 | 6/2003 | Koo et al. |
| 2003/0137961 A1 | 7/2003 | Tsirtsis et al. |
| 2003/0137991 A1 | 7/2003 | Doshi et al. |
| 2003/0142650 A1* | 7/2003 | Fan ................ 370/338 |
| 2003/0176188 A1 | 9/2003 | O'neill |
| 2003/0228868 A1 | 12/2003 | Turanyi et al. |

FOREIGN PATENT DOCUMENTS

| | | |
|---|---|---|
| WO | 9512297 | 5/1995 |
| WO | 9627993 A1 | 9/1996 |
| WO | 9712475 A1 | 4/1997 |
| WO | 9847302 | 10/1998 |

OTHER PUBLICATIONS

Berger, L., et al., "RSVP Extensions for IPSEC Data Flows," IETF, Network Working Group, Request for Comments: 2207, pp. 1-14 (Sep. 1997).

Berger, L., "RSVP Refresh Overhead Reduction Extensions," IETF Network Working Group, Request for Comments: 2961, pp. 1-34 (Apr. 2001).

(56) References Cited

OTHER PUBLICATIONS

Bos et al., "A Framework for End-to-End Perceived Quality of Service Negotiation", IETF Internal Draft, draft-bos-mmusic-sdpqos-framework-00.txt, Nov. 2001, pp. 1-22.
Braden, R., "Resource ReSerVation Protocol (RSVP)—Ver. 1, Message Processing Rules," IETF, Network Working Group, Request for Comments: 2209, pp. 1-25 (Sep. 1997).
Braden, R., "Resource ReSerVation Protocol (RSVP)—Ver. 1 Functional Specification". IETF, Network Working Group, Request for Comments: 2205, pp. 1-112 (Sep. 1997).
Camarillo, G., et al., "Integration of Resource Management and SIP," IETF Internet Draft, draft-ietf-sip-manyfolks-resource-04.ps, Feb. 25, 2002, pp. 1-18.
Campbell, Andrew T. et al., "IP Micro-Mobility Protocols", Mobile Computing and Communications Review (MC2R), vol. 4, No. 4, pp. 45-53, (Oct. 2001).
ETRI, "Source Specific Multicast (SSM) Explicit Multicast (Xcast)" pp. 1-27 (Jun. 28, 2001).
HO, Michael. "Integration AAA with Mobile IPv4", Internet Draft, pp. 1-59, Apr. 2002.
Internation Search Report PCT/US2003/010578, International Search Authority-US, Oct. 17, 2003.
Johnson, D., et al., IETF Mobile IP Working Group, "Mobility Support in IPv6,"; February 26, 2003 Downloaded From http://www.join.uni-muenster.de on Dec. 29, 2004, p. 1-169.
Karagiannis, Georgios. "Mobile IP: State of the Art Report," Ericsson, No. 3/0362-FCP NB 102 88 UEN, pp. 1-63, (Jul. 13, 1999).
Li, Yalun et al. "Protocol Architecture for Universal Personal Computing," IEEE Journal on Selected Areas in Communications, IEEE Inc. New York, US, vol. 15, No. 8, Oct. 1, 1997, pp. 1467-1476, XP000721278 ISSN: 0733-8716.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Marshall, W. et al. "Integration of Resource Management and SIP: SIP Extensions for Resource Management," IETF Internet Draft, draft-ietf-sip-manyfolks-resource-02.txt, Aug. 2001, pp. 1-28.
Moy, J., "OSPF Version 2", Network Working Group, Request for Comments: 2328, pp. 1-244 (Apr. 1998).
Papalilo, D. et al. "Extending SIP for QoS Support", www.coritel.it/publications/IP_download/papalilo-salsano-veltri.pdf, Dec. 8, 2001, pp. 1-6.
PCT International Search Report, for International Application No. PCT/US03/10578, Oct. 17, 2003.
Perkins C, et al., " IP Mobility Support; rfc2002.txt" IETF Standard, Internet Engineering Task Force, IETF, CH, Oct. 1, 1996 (Oct. 1, 1996), XP015007786 ISSN: 0000-0003.
Perkins, C., "IP Mobility Support for IPv4", Nokia Research Center, Network Working Group, Request for Comments: 3220, Jan. 2002, downloaded from http://www.ietf.org on Dec. 29, 2004, pp. 1-92.
Perkins, C., "IP Mobility Support", IBM, Network Working Group, Request for Comments: 2002, pp. 1-79 (Oct. 1996).
Rosenberg J et al:RFAC 3261: "SIP: Session Initiation Protocol" 20020601; 20020600, Jun. 1, 2002, pp. 1-269, XP015009039.
Schulzrinne et al., "Application-Layer Mobility Using SIP", 0-7803-7133 IEEE, pp. 29-36, Jan. 2000.
Thulasi, A., et al., "IPv6 Prefix Delegation Using ICMPv6", Network Working Group, Hewlett-Packard, pp. 1-34, Apr. 2004.
TIA/EIA/IS-707A.8 "Data Service Options for Spread Spectrum Systems: Radio Link Protocol Type 2" pp. 1-1:4:12 (Mar. 1999).
Valko, A.G. et al.: "Cellular IP: A New Approach to Internet Host Mobility" Computer Communication Review, Association for Computing Machinery. New York, US vol. 29, No. 1, Jan. 1999, pp. 50-65, XP000823873 ISSN: 0146-4833, p. 56, Line 7-Line 13.
Wedlund et al: "Mobility Support Using SIP", Proc. of ACM/IEEE International Conference on Wireless and Mobile Multimedia (WoWMoM '99), Seattle, Washington, Aug. 1999.
Wroclawski, J., "The Use of RSVP with IETF Integrated Services," IETF, Network Working Group, Request for Comments: 2210, pp. 1-33 (Sep. 1997).
Zhou, S., et al., "A Location Management Scheme for Mobility Support in Wireless IP Networks Using Session Initiation Protocol (SIP)", 1531-2216/01 IEEE, pp. 486-491, Oct. 2001.
Co-pending U.S. Appl. No. 08/144,901, filed on Oct. 28, 1993.

\* cited by examiner

SUPPORT OF DISPARATE ADDRESSING PLANS AND DYNAMIC HA ADDRESS ALLOCATION IN MOBILE IP

RELATED APPLICATIONS

The present application is a continuation of pending U.S. patent application Ser. No. 12/099,026, now U.S. Pat. No. 8,559,411, filed on Apr. 7, 2008, titled SUPPORT OF DISPARATE ADDRESSING PLANS AND DYNAMIC HA ADDRESS ALLOCATION IN MOBILE IP, and which claims the benefit of the filing date of U.S. patent application Ser. No. 10/408,726, now U.S. Pat. No. 7,356,020, filed on Apr. 7, 2003, titled SUPPORT OF DISPARATE ADDRESSING PLANS AND DYNAMIC HA ADDRESS ALLOCATION IN MOBILE IP, and which claims the benefit of the filing date of U.S. Provisional Patent Application Ser. No. 60/370,836 filed Apr. 8, 2002, titled "METHODS AND APPARATUS FOR THE SUPPORT OF DISPARATE ADDRESSING PLANS AND DYNAMIC HA ADDRESS ALLOCATION IN MOBILE IP REGIONAL TUNNELING." Each of the preceding identified US patent applications are hereby expressly incorporated by reference in their entirety.

BACKGROUND

For the purpose of understanding the invention it is useful to have a basic understanding of Mobile IP. Mobile IP (v4/v6), also indicated as MIPv4 [MIPv4] and MIPv6 [MIPv6], enables a mobile node (MN) to register its temporary location indicated by a care-of-address (CoA) to its Home Agent (HA). The HA then keeps a mapping (also called a binding) between the MN's permanent address, otherwise called Home Address (HoA), and the registered CoA so that packets for that MN can be redirected to its current location using IP encapsulation techniques (tunneling).

The CoA used by a MN can be an address that belongs to a Foreign Agent (FA) when MIPv4 is used or, in MIPv4 and MIPv6, it can be a temporarily allocated address to the MN itself in which case is called a collocated care-of-address (CCoA).

The concepts and solutions described here are applicable to both MIPv4 and MIP unless otherwise mentioned.

Regional tunneling (REGTUN) is one technique sometimes used in conjunction with Mobile IP. This approach uses a Gateway Foreign Agent (GFA) between the FA and the HA to improve MIP signaling. Specifically, the MN can register the local GFA CoA into the HA using an MIP registration with the HA that is routed via the GFA. Then each binding update under the same GFA goes just to the GFA instead of the HA, and changes the FA CoA for the GFA. The GFA switches the GFA CoA traffic for the specific HoA into the FA CoA matching that HoA and GFA CoA. The GFA update is a regional registration and it avoids having to refresh the HA on each hand-off which is a bandwidth and latency gain because the HA could be a very distant node from the FA/GFA.

The problem with this draft (http://www.ietf.org/proceedings/01dec/I-D/draft-ietf-mobileip-reg-tunnel-05.txt) is that the signaling scheme assumes that the two addressing schemes are the same either side of the GFA, and no support is enabled for dynamic HA allocation, both of which are common requirements in MIP. Therefore, a need exists for apparatus and methods that will support disparate addressing plans and dynamic HA address allocation in MIP signaling.

SUMMARY OF THE INVENTION

The present invention is directed to methods and apparatus establishing communications sessions and, more particularly, to enhanced methods of performing signaling through an intermediate node that straddles different addressing domains, when that signaling is trying to control a process undertaken between the intermediate node and an upstream node. Various methods for enhancing Mobile IP discovery of the IP addresses of Mobile IP nodes, and the subsequent configuration of Mobile IP forwarding tunnels is then described.

In accordance with one feature of the present invention, rather than allow a downstream node to use the address of the downstream interface on an intermediate node, that is in the same addressing domain as the downstream node, for undertaking a process with the upstream node, in accordance with the present invention, the address of the upstream interface of the intermediate node, that is in the same addressing domain as the upstream node, is instead selected to be the address on the intermediate node for the communications process with the upstream node. This ensures that the upstream node can communicate with the intermediate node for the identified process, even when the two addressing domains are different and the downstream interface of the intermediate node is not reachable from the upstream node. In the case of Mobile IP, the communications process is the MIP tunneling between, for example, an upstream Home Agent and an intermediate regional node such as a Gateway Foreign Agent, which is configured using a MIP Registration Request message from the downstream foreign agent. This then ensures that the tunnel be correctly set-up even when private addresses are used between the foreign agent and the regional node whilst public addresses are used between the regional node and the home agent. Existing Mobile IP signaling instead uses a single piece of information to identify the address of the regional node and the process address for the upstream node with the regional node, which fails in the case of distinct addressing domains on either side of the regional node.

Further, in accordance with this invention, the specific intermediate node, as well as the upstream interface and therefore the upstream address at that intermediate node, can all be dynamically selected during the signaling phase, based on information about the type of communications process being set-up, the entity and its location that is requesting that it be set-up, and the type and location of the upstream node. This novel feature of the invention is particularly useful for supporting multiple intermediate nodes in a domain, each of which serves a subset of all the downstream nodes in a domain, and for ensuring that the selected upstream interface of the selected intermediate node is in the same addressing domain as the upstream node. In the specific case of Mobile IP, the present invention enables the regional node to be dynamically allocated at the foreign agent, optionally with the assistance of the Authentication, Authorization and Accounting (AAA) system, and the upstream address of the regional node to be dynamically allocated by the regional node itself, optionally again with assistance from the AAA system. This then avoids all Mobile Nodes having to be configured with, or discover, a table that lists all possible HAs and the associated regional node and upstream interface at that regional node that matches that particular Home Agent. Existing MIP signaling relies on the address of the regional node being known at the foreign agent, and optionally communicated to the Mobile Node in advance of the Registration signal being sent from the Mobile Node, that will traverse the regional node towards the Home Agent. This clearly does not facilitate dynamic allocation of the regional node, nor the dynamic allocation of the associated upstream interface address.

Inventive methods, in accordance with the present invention, are also described for dynamically allocating the Home Agent in advance of dynamically allocating the associated regional node, and for communicating the addresses of these dynamically allocated nodes to the other Mobile IP nodes that need that address information for subsequent Mobile IP signaling. The address of the HA should be communicated to the regional node so that the regional node can forward the Registration message to that HA and invoke the tunnel building process between the HA and the regional node. Existing MIP signaling for the regional node does not support dynamic allocation of a HA.

Another novel method, in accordance with the present invention, is described for indicating to a Mobile Node when the allocated regional node, that was dynamically allocated to the Mobile Node, becomes invalid, triggering another MIP signaling phase from the Mobile Node to dynamically allocate a new regional node and associated upstream interface address. This method is in contrast to existing MIP signaling which cannot accommodate a dynamically allocated regional node.

Numerous additional features and benefits of the present invention will be apparent in view of the Figures and detailed description which follows.

DESCRIPTION OF THE INVENTION

The methods and apparatus of the present invention are directed to a number of procedures to enable the IP signaling layer (MIP or similar mechanisms) to better support the existence of a regional node.

Figure 1:
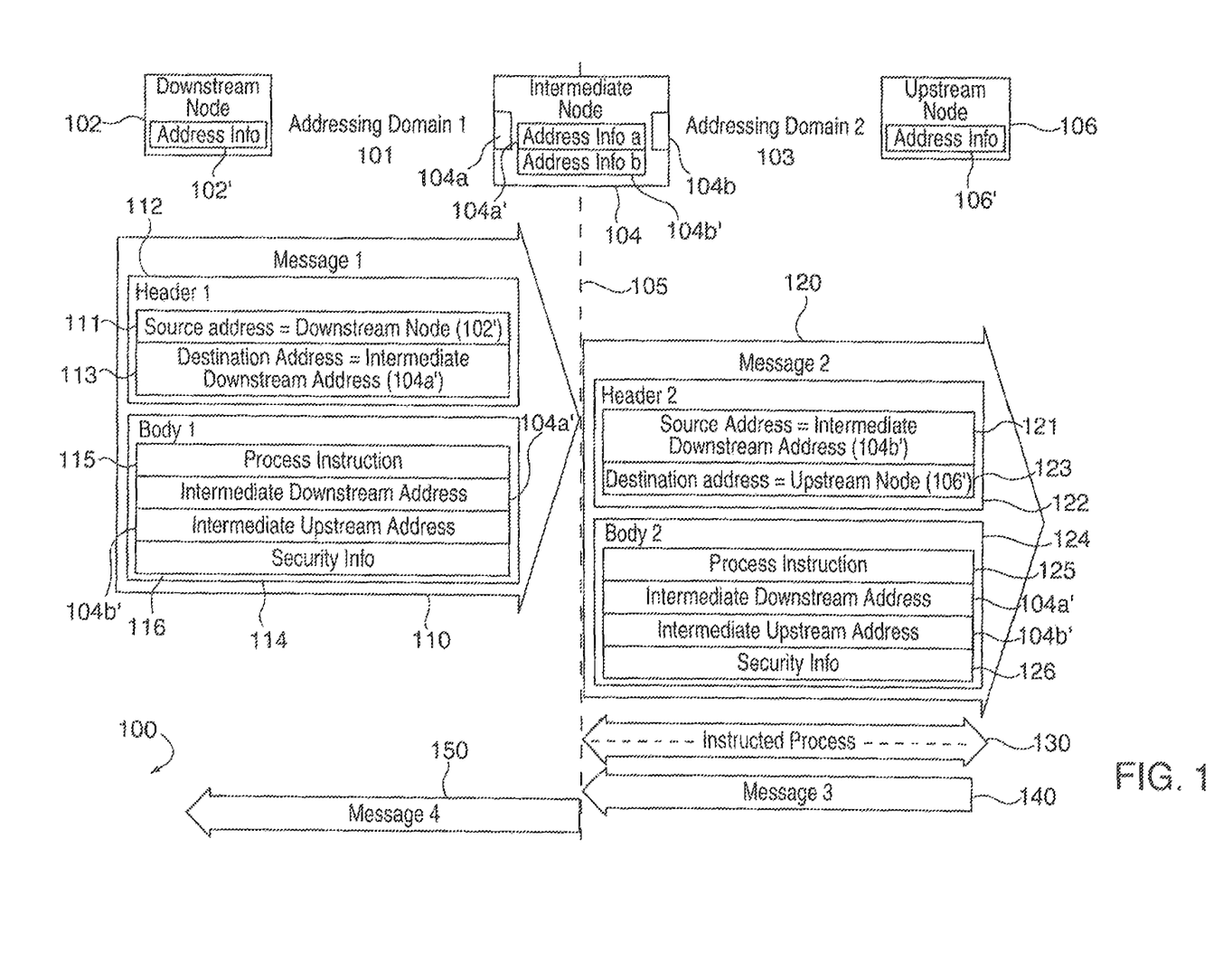
FIG. 1 illustrates two addressing domains; the generic downstream, intermediate and upstream nodes; and the signals employed to invoke the process between the upstream node and the upstream interface of the (intermediate) node.

FIG. 1 shows an overall communication domain 100 including an exemplary addressing domain 1 101 and an exemplary addressing domain 2 103. Addressing domain 1 101 includes a downstream node 102; addressing domain 2 103 includes an upstream node 106. An intermediate node 104 is located on a boundary 105 separating addressing domain 1 101 from addressing domain 2 103. Intermediate node 104 includes two addressing interfaces: addressing domain 1 interface 104a and addressing domain 2 interface 104b. Intermediate node 104 also includes address information 104a' associated with interface 104a and address information b 104b' associated with interface 104b. Downstream node 102 may be, for example, a visited access node; intermediate node 104 may be, for example, a MIP Gateway Foreign Node; upstream node 106 may be, for example, a Mobile IP Home Agent.

The downstream node 102 and the intermediate node 104 have interfaces with addresses, 102' and 104a', respectively, from the addressing domain 1 101, such that messages can flow from the downstream node 102 to the downstream interface of the upstream node 104a. The upstream node 106 and the intermediate node 104 have interfaces with addresses, 106' and 104b', respectively, from the addressing domain 2 103, such that messages can flow from the upstream interface of the intermediate node 104b to the upstream node 106.

FIG. 1 further shows instructed processes 130, as illustrated by the dashed bi-directional arrows between the upstream node 106 and the intermediate node 104. The process 130 may be, for example, the invocation and management of a tunnel.

When the addressing domain 1 101 and addressing domain 2 103 are independent addressing domains, such that reachability is not supported between those addressing domains, then messages are not generally able to flow between the upstream node 106 and the downstream interface of the intermediate node 104a, such that any process 130 undertaken between the upstream node 106 and the intermediate node 104, needs to be undertaken using the interface address 104b'.

To invoke such a process 130 from the downstream node 102, or any node further downstream of the downstream node 102, a message 1, 110, is first sent from the downstream node 102 to the intermediate node 104 using interface 104a, possibly as a result of an incoming message from a node further downstream of the downstream node 102. Message 1, 110, includes a message header 112 which includes source and destination addresses, 111, 113, respectively, equal to the addresses of the downstream node 102' and the downstream interface of the intermediate node 104a', respectively. Message 1, 110, also includes a message body 114 that includes an instruction 115 to invoke the process 130 between the upstream node 106 and the intermediate node 104. The Message body 1, 114, also includes an information element indicating the intermediate node downstream address 104a' that has been dynamically allocated at the downstream node 102. The message body 1 114 may additionally contain the intermediate node upstream address 104b', which without loss of generality may be empty. The information in the message body 1 114 is typically signed by the downstream node 102 as represented by security information 116 to prevent its contents being manipulated by an attacker situated between the downstream node 102 and the intermediate node 104.

To further invoke such a process 130 from the intermediate node 104, a message 2, 120, is first sent from the upstream interface of the intermediate node 104b to the upstream node 106. Message 2, 120, includes a message 2 header 122 which includes source and destination addresses, 121, 123, respectively, equal to the addresses of the intermediate node upstream interface 104b' and the upstream node 106', respectively. Message 2, 120, also includes a message 2 body 124 that includes an instruction 125 to invoke the process 130 between the upstream node 106 and the intermediate node 104 that was obtained from message 1, 110. The Message body 2, 124, also includes an information element indicating the intermediate node downstream address 104a' that has been dynamically allocated at the downstream node 102. The message body 2 124 also includes the intermediate node upstream address 104b', which was generated at the intermediate node 104. The information in the message body 2 124 is typically signed, as indicated by security information 126, by the intermediate node 104 to prevent its contents being manipulated by an attacker situated between the intermediate node 104 and the upstream node 106. Without loss of generality, the generation of the upstream address 104b' at the intermediate node 104 can be undertaken in a number of ways. Firstly, it can be obtained from message body 1, 114, if the intermediate node upstream address 104b' was dynamically allocated at the downstream node 102 along with the downstream address 104a'. Secondly, the intermediate node upstream address 104b'can be dynamically allocated at the intermediate node 104 itself and inserted into message body 2 124 instead of any empty or default value passed in message body 1, 114. Thirdly, the upstream address on the intermediate node 104b' can be requested and obtained by either the downstream and/or intermediate nodes 102,104 from an external policy server such as an Authentication, Authorization and Accounting Server.

The upstream node 106 can then invoke the process 130 with the upstream address 104b' of the intermediate node 104. In addition, messages 140 and 150 are then used to carry the dynamically allocated addresses 104a' and 104b' back to the downstream node 102 and to any nodes further downstream from the downstream node 102 that needs those addresses 104a', 104b' to repeatedly invoke the process 130 via that intermediate node 104.

This sequence ensures that the process 130 from the upstream node 106 does not use the downstream address 104a' of the intermediate node 104 which in the case of separate addressing domains may not be reachable.

The application of the above sequence will now be explained, without loss of generality, for the specific case of the downstream node 102 being a MIP foreign agent, the upstream node 106 being a MIP home agent, the intermediate node 104 being a MIP regional node such as Gateway Foreign Agent, and the process 130 being the construction of a MIP tunnel between the MIP Home Agent and the Gateway Foreign Agent on request from a Mobile Node.

Figure 2:
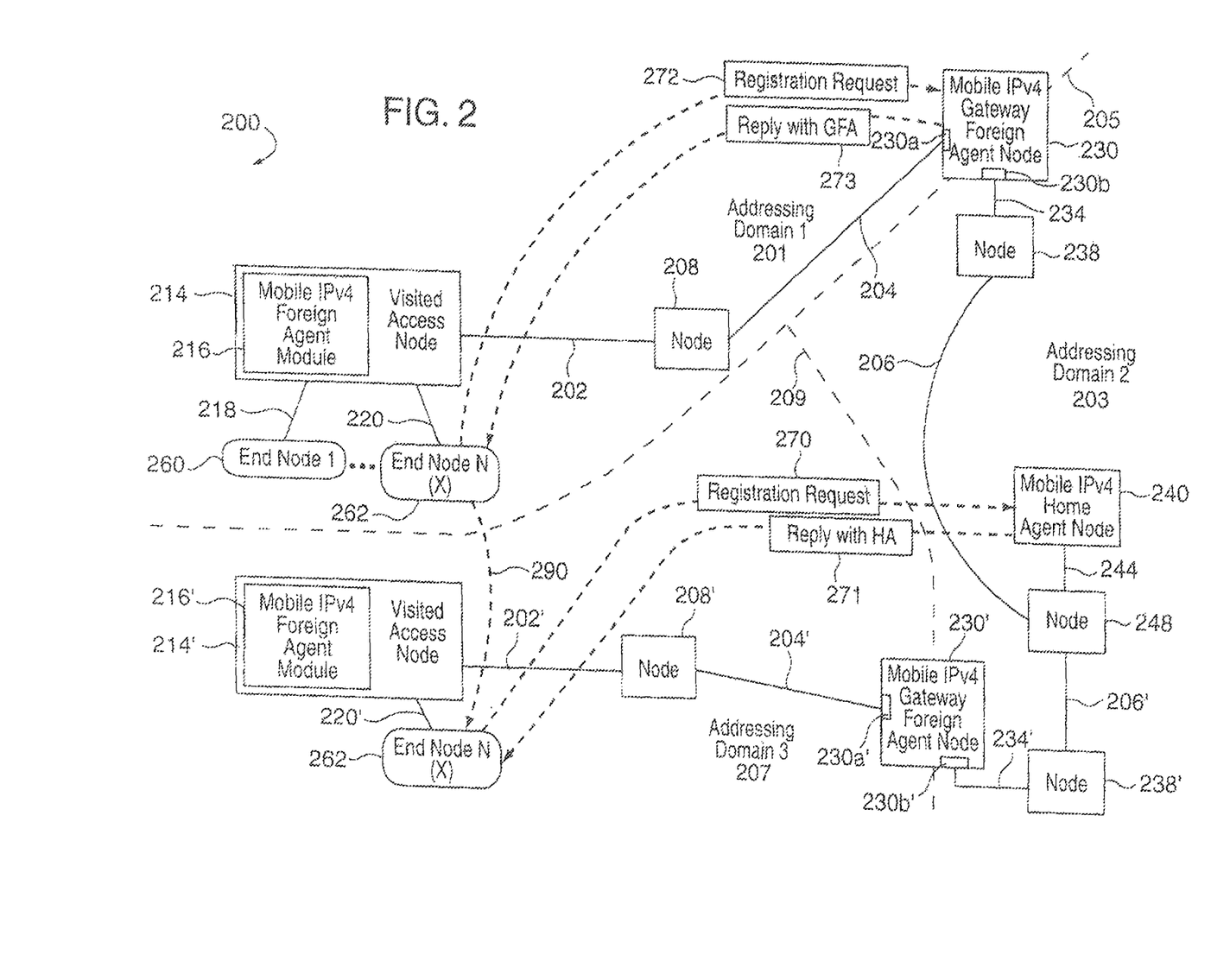
FIG. 2 illustrates a diagram of an exemplary network supporting a Mobile IP Regional node and the Mobile IP signals used to invoke and manage the tunnel between the Home Agent and the regional node, as well as the tunnel between the regional node and the foreign agent.

FIG. 2 shows an exemplary communications network 200 including 3 addressing domains: addressing domain 1 201, addressing domain 2 203, and addressing domain 3 207. Boundary line 205 separates addressing domain 1 201 from addressing domains 203 and 207. Boundary line 209 separates addressing domain 2 203 from addressing domain 3 207.

The exemplary communications network 200 comprises a visited access node 214, e.g. a visited access router, including a Mobile IP foreign agent (FA) 216, a Mobile IP Gateway foreign agent (GFA) 230, and a Mobile IP Home agent (HA) 240. The GFA 230 is located on the boundary 205 between addressing domain 1 201 and addressing domain 2 203. Within addressing domain 1 201, the GFA 230 is connected to the FA 216 via a node 208 and links 204 and 202. Within addressing domain 2 203, the GFA 230 is connected to the HA 240 through nodes 238 and 248 via links 234, 206 and 244. Link 234 couples GFA 230 to node 238; link 206 couples node 238 to node 248; link 244 couples node 244 to HA 240. The GFA 230 therefore has two different interfaces, such that a GFA interface 230a on link 204 has an address from the same addressing domain 1 201 as that of the FA 216 interface connected to link 202. In contrast, a GFA 230 interface 230b attached to link 234 has an address allocated from the same addressing domain 2 203 as the address allocated to the interface on the HA 240 connected to link 244. In the communications network 200 it can be seen that no path exists between the HA 240 and the FA 216 that does not traverse the GFA 230. In addition, the addresses from the addressing domain 1 201 shared by the FA 216 and the GFA 230 are not routable from the addresses from the addressing domain 2 203 shared by the HA 240 and the GFA 230.

Exemplary end node 1 260 and exemplary end node N (X) 262 are coupled to the communications network 200 through the visited access node 214. Specifically, links 218, 220 couple end nodes 260, 262, respectively, to visited access node 214 with its FA 216. The end nodes 260, 262 may be, for example, mobile nodes or mobile terminals. Many such end nodes 260, 262 and visited access nodes 214 will typically exist in communications network 200, along with a smaller number of GFAs 230. Each such GFA 230 will be assigned to a subset of the visited access nodes 214, and advertised to the end nodes 260, 262 which contain MIP Mobile Node software. The movement of the end nodes 260, 262 between visited access nodes 214 can eventually result in the end node receiving a newly advertised GFA 230 address, this address being that of the interface 230a connected to link 204 which can be known to the FA 216. Whilst the exemplary Mobile Node (MN) N (X) 262 receives the same GFA 230 address from any FA 216, the MN 262 can issue MIP Regional Registration messages 272 towards the GFA 230, potentially via the FA 214. This message 272 updates the Care of Address in the GFA 230 for the home address of the MN 262, this care of address being either the FA 216 address or the address of the MN 262, such that a tunnel can be constructed between the GFA 230 and the Care of address. The Registration Reply message 273 is then returned to the MN 262 visiting the same MIP nodes as that visited by the Registration message.

In order to further explain variations of the present invention, the connectivity between addressing domain 3 207 and addressing domain 2 203 is described below. Dotted arrow line 290 represents the transition of exemplary end node N (X) 262 from addressing domain 1 201 to addressing domain 3 207. Addressing domain 3 207 includes a visited access node 214', with a mobile IP Foreign agent module 216', and node 208'. Link 202' couples FA 216' to node 208'. Node 208' is coupled to a MIP Gateway Foreign Agent Node 230' via link 204'. Addressing domain 2 203 further comprises node 238' which is coupled to node 248 via link 206'. Node 238' is also coupled to GFA 230' via link 234'.

MIP Gateway Foreign Agent Node 230' is located on the boundary, indicated by dashed line 209, between addressing domain 2 203 and addressing domain 3 207. GFA 230' includes interfaces 230'a and 230'b. The GFA 230' therefore has two different interfaces, such that the GFA interface 230'a on link 204' has an address from the same addressing domain 3 207 as that of the FA 216' interface connected to link 202'. In contrast, the GFA 230' interface 230'b attached to link 234' has an address allocated from the same addressing domain 2 203 as the address allocated to the interface on the HA 240 connected to link 244.

Figure 4:
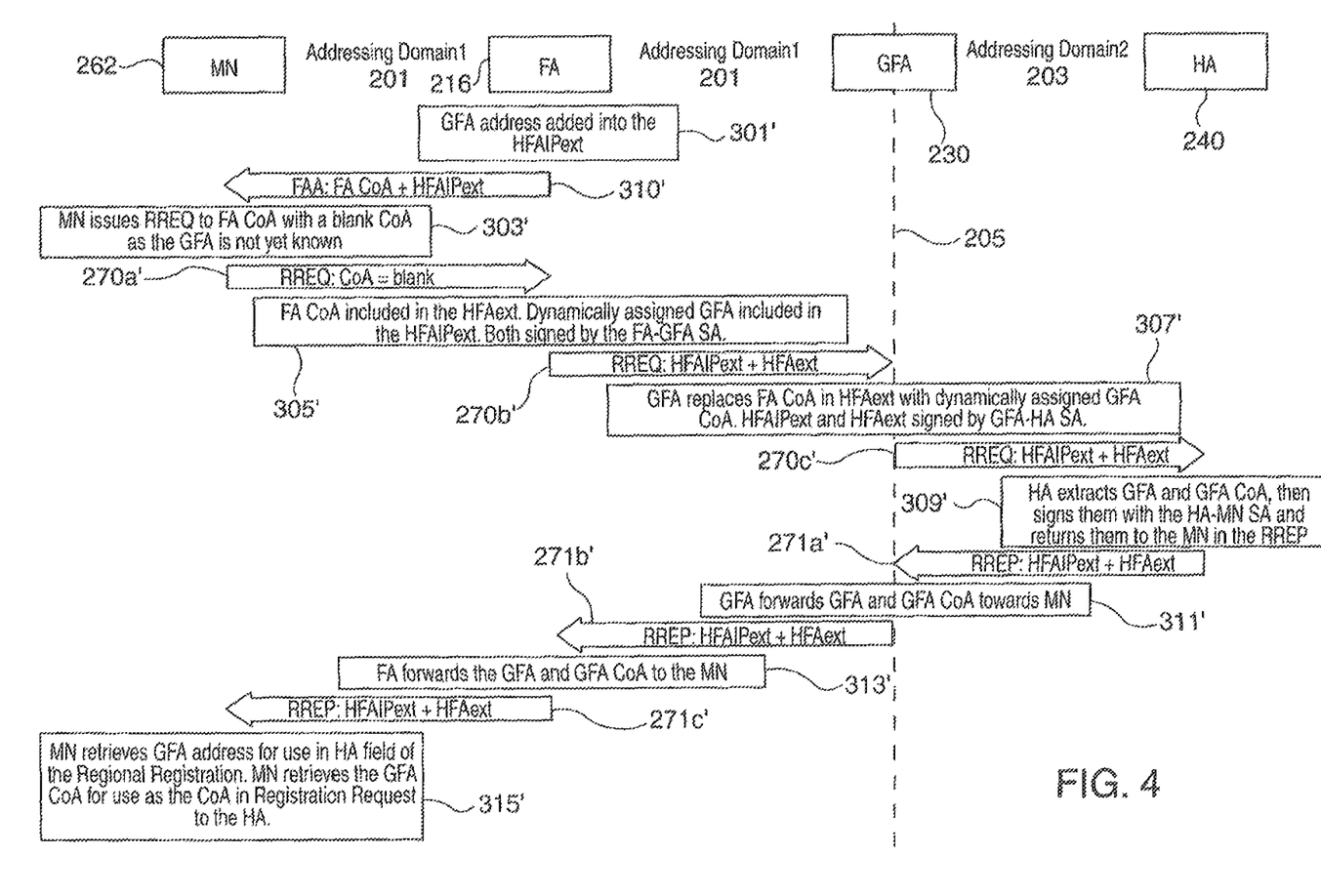
FIG. 4 illustrates the MIP extensions used to carry the dynamically allocated GFA and GFA CoA to the necessary MIP nodes.
Figure 5:
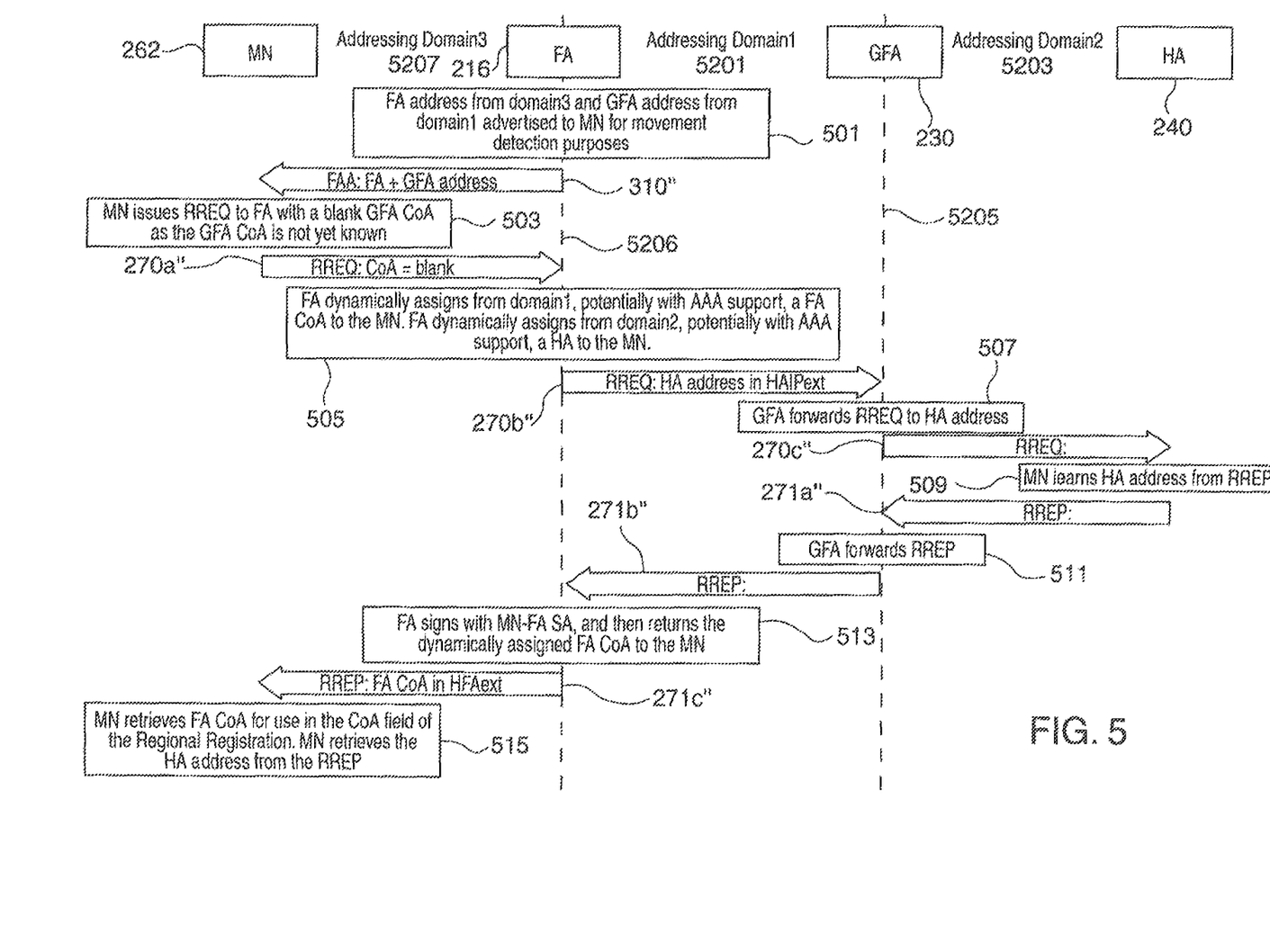
FIG. 5 illustrates the dynamic allocation of a Home Agent in the presence of a regional node, as well as the MIP signaling changes when the generic intermediate node is additionally a foreign agent that straddles two addressing domains.

When however, the MN 262 receives a new GFA 230' address from the FA 216', then the MN 262 knows that no MIP tunnel exists between the Home Agent 240 of the MN 262 and the GFA 230' and, in accordance with the invention, therefore issues a MIP Registration message 270 towards the HA 240, that is forwarded via the FA 216' and the GFA 230'. This message is followed by a Registration Reply message 271 back to the MN 262 via the same set of MIP nodes. The message 270 includes a Care of address field, which is typically populated by the MN 262, using the GFA 230' address advertised by the FA 216', this typically being the address of interface 230a' at the GFA 230'. The message 270 installs the Care of address of the GFA 230' into the HA 240 so that a MIP tunnel can be built for the MN 262 home address between the HA 240 and the GFA 230'. Packets will then be delivered to the new GFA 230' and messages 272 and 273 can then update the GFA 230' with each new MN CoA as the MN changes FA 216' under the same GFA 230'. This procedure however fails if the address of the GFA 230' on link 204' is not reachable from the HA 240. Alternative signaling as shown in FIGS. 3 to 5 and described next may instead be used, in accordance with the present invention.

Figure 3:
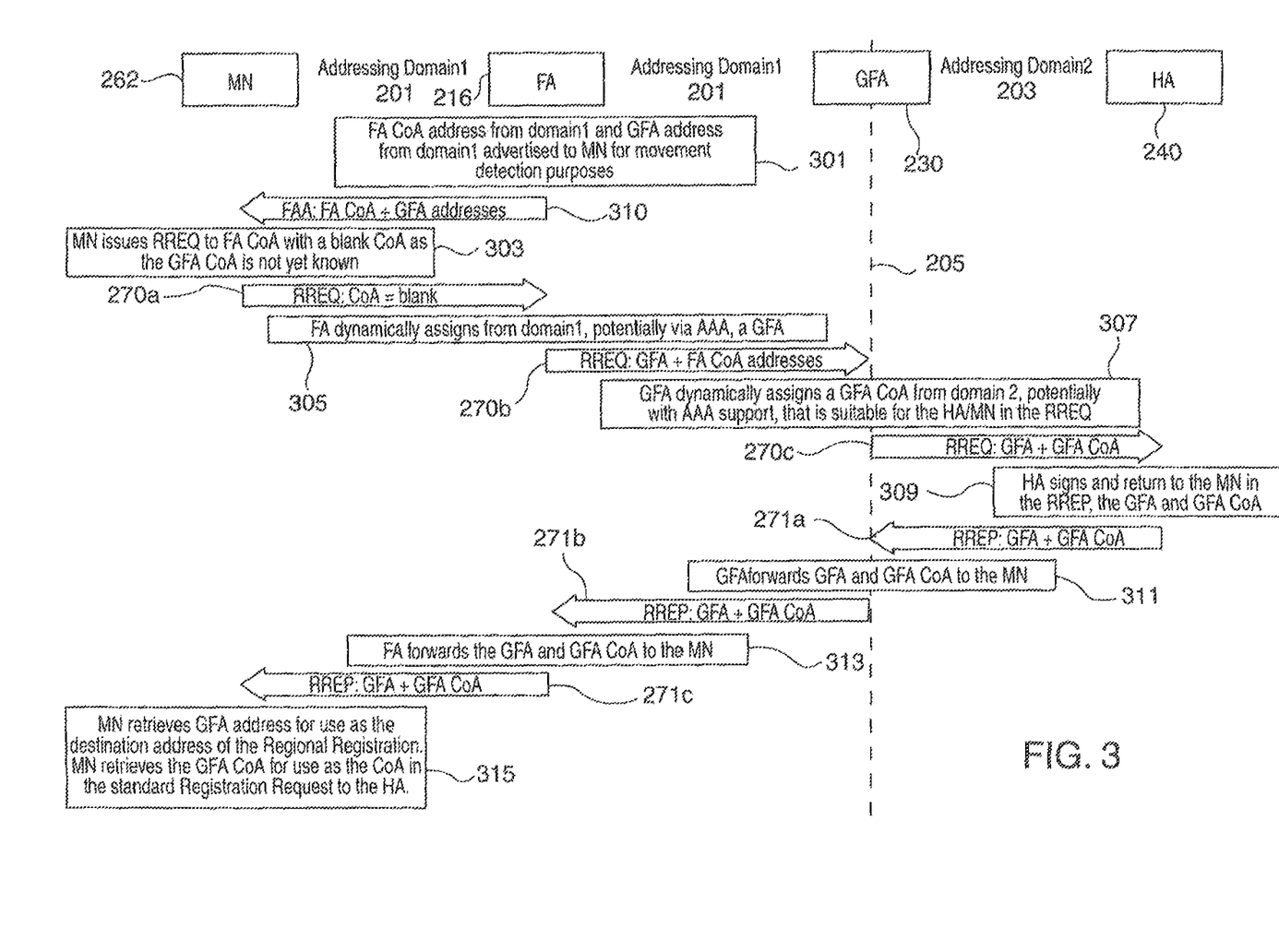
FIG. 3 illustrates the MIP signaling flow for the dynamic allocation of the regional node, and the interface on that regional node, in the case of a Gateway Foreign Agent, as well as the discovery of a change of regional node.

FIG. 3 shows the dynamic allocation of the GFA 230 at the FA 216, and the dynamic allocation of the GFA CoA at the GFA 230. The FA 216 of FIG. 3 equates to the downstream node 102 of FIG. 1, the GFA 230 of FIG. 3 equates to the intermediate node 104 of FIG. 1 and the HA 240 equates to the upstream node 106 of FIG. 1. FIG. 3 is separated into an addressing domain 1 201 including MN 262 and FA 216 and an addressing domain 2 203 including HA 240. GFA 230 is situated on a boundary 205 separating domains 201 and 203. The process 130 of FIG. 1 equates to the MIP tunnel management between the HA 240 and the GFA 230 of FIG. 2. Message 270 of FIG. 2 is broken up into hop by hop messages 270a, 270b and 270c. Message 110 of FIG. 1 equates to message 270b of FIG. 3 and message 120 of FIG. 1 equates to message 270c in FIG. 3. The downstream interface address 104a' on the intermediate node equates to the GFA address in FIG. 3 whilst the upstream interface address 104b' of the intermediate node equates to the GFA CoA in FIG. 3.

In step 301, the FA 216 constructs a message 310 with the FA CoA address from domain 1 201 and GFA address from domain 1 201 advertised to MN 262 for movement detection purposes, and sends the message 310 to the MN 262. The subsequent messaging of FIG. 3 is triggered when the MN 262 receives message 310 from FA 216, which includes a new default GFA address, and which acts as a common identifier for any dynamically allocated GFA at that FA 216. This means that if the MN 262 sees a new default GFA address then it must also acquire a new dynamically allocated GFA. Message 310 also includes the FA CoA of the FA 216 as is usual in MIP signaling.

Next, in step 303, the MN 262 then sends Registration message 270a to the FA 216 including the Home address and HA 240 address of the MN 262, with the intention of updating the GFA CoA for that home address at the HA 240. The Registration message 270a includes a CoA field that can either be left blank by the MN 262 or can contain the default GFA address. In step 305, FA 216 then dynamically allocates a GFA to the MN 262, potentially with help from a policy server, e.g. a AAA server, that has an upstream interface that is reachable from the HA 240 included in the message 270a. Note that the HA is globally unique through the combination of the HA address and the realm part of the Network Address Identifier of the MN 262 that are included in message 270a. The GFA address and the FA CoA are then securely passed to the assigned GFA in message 270b. The FA CoA enables the GFA to build a tunnel to the present FA 216 of the MN 262 whilst the GFA address is included so it can be passed to the HA 240. In step 307, the GFA 230 then dynamically assigns a GFA CoA from an interface that is reachable from the HA 240 and then securely passes this address, along with the GFA address to the HA in message 270c. It does this by adding an extension to the MIP Registration message containing the GFA CoA, that is used instead of the CoA field which is either blank or includes the default GFA address, for construction of the MIP tunnel. The HA 240 can then build that tunnel towards the GFA CoA rather than towards the GFA address, because the GFA address is not itself reachable from the HA 240. Next, in step 309, the HA 240 includes the GFA and GFA CoA into the MIP Registration Reply message 271a, signs this message with the secret it shares with the MN 262, and sends message 271a to the GFA 230. In step 311, the GFA 230 forwards the GFA and GFA CoA to the FA 216 in MIP Registration Reply Message 271b. Subsequently, in step 313, FA 216 forwards the GFA and GFA CoA to MN 262 in MIP Registration Reply Message 271c. Finally, in step 315, MN 262 can then securely receive the GFA and GFA CoA which it can then include in subsequent MIP Registration messages 270 and 272 to refresh the installed MIP bindings in the HA and the GFA.

Note that, in other variations of the present invention, the GFA and GFA CoA can be passed back to the MN 262 in many other ways than via the HA, that make use of a different set of MIP security associations to sign the extension carrying those addresses. Note also that in another variation of the present invention, the GFA CoA can instead be dynamically assigned at the same time as the GFA is assigned at the FA, and the GFA CoA then passed in message 270b to the allocated GFA.

FIG. 4 repeats the elements (262, 216, 230, 240), domains (201, 203) and boundary 205 of FIG. 3. Steps (301', 303', 305', 307', 309', 311', 313', 315') of FIG. 4 equate to the steps (301, 303, 305, 307, 309, 311, 313, 315) of FIG. 3, respectively. Similarly, messages (310', 270a', 270b', 270c', 271a', 271b', 271c') of FIG. 4 equate to messages (310, 270a, 270b, 270c, 271a, 271b, 271c) of FIG. 3, respectively.

In addition, FIG. 4 shows the extensions used to carry the FA CoA, GFA CoA and the GFA address in messages 270' and 271'. The Hierarchical Foreign Agent Extension (HFAext) carries the FA CoA in message 270b' and carries the GFA CoA in message 270c' and messages 271'. Note that if the GFA CoA is also assigned at the FA 216 then two HFAext are included in message 270b', which means that either a flag bit is required in the HFAext to distinguish between the two addresses, or the FA CoA is signed with the secret shared between the FA 216 and the GFA 230 whilst the GFA CoA is signed with the secret shared between the FA 216 and the HA 240, the type of signature therefore uniquely identifying the contents of each HFAext. The GFA address is carried in the Hierarchical Foreign Agent IP address extension (HFAIPext) in messages 270b', 270c' to the HA 240, and messages 271' back to the MN 262.

The steps and signaling of FIG. 4 are described below. In step 301', FA 216 adds the GFA address into the HFAIP extension, constructs message 310' which includes FA CoA+ HFAIPext, and sends message 310' to MN 262. This triggers the subsequent signaling described in FIG. 4. Next, in step 303', MN 262 issues RREQ message 270a' to FA 216 with a blank CoA as the GFA CoA is not yet assigned. Then, in step 305', FA 216 includes FA CoA in the HFA extension, includes the dynamically assigned GFA in the HFAIP extension, signs both by the FA-GFA shared secret, and sends RREQ message 270b' including HFAIPext+HFAext to GFA 230. Next, in step 307', GFA 230 replaces FA CoA in HFAext with a dynamically assigned GFA CoA, signs HFAIPext and HFAext with GFA-HA shared secret, and sends RREQ message 270c' including HFAIPext+HFAext to HA 240. Upon reception of message 270c', the process 130 is triggered at the HA 240 towards the GFA 230. Additionally, the HA 240 extracts GFA and GFA CoA from message 270c', signs them with the HA-MN shared secret, and sends them toward the MN 262 in the RREP message 271a' including HFAIPext+HFAext to GFA 230. GFA 230, in step 311' forwards GFA and GFA CoA towards MN 262 via RREP message 271b' including HFAIPext+HFAext to FA 216. Next, FA 216, in step 313', forwards the GFA and GFA CoA to MN 262 via Message 271c' including HFAIPext+HFAext. Finally, in step 315', MN 262 retrieves GFA address for use in the HA field of the Regional Registration, and the GFA CoA for use as the CoA in Registration Requests to the HA.

FIG. 5 illustrates the additional processing associated with a dynamically assigned FA CoA and a dynamically assigned HA.

FIG. 5 repeats the elements (262, 216, 230, 240) of FIG. 3. FIG. 5 includes 3 addressing domains: an addressing domain 1 5201, an addressing domain 2 5203, and an addressing domain 3 5207. A boundary line 5205 separates domain 1 5201 from domain 2 5203. A boundary line 5206 separates domain 1 5201 from domain 3 5207. MN 262 is in addressing domain 3 5207. FA 216 is located on the boundary 5206 between addressing domain 3 5207 and addressing domain 1 5201. GFA 230 is located on the other boundary 5205 separating addressing domain 1 5201 from addressing domain 2 5203. HA 240 is located in addressing domain 2 5203. Steps (501, 503, 505, 507, 509, 511, 513, 515) of FIG. 5 are similar to the steps (301, 303, 305, 307, 309, 311, 313, 315) of FIG. 3, respectively. Messages (310", 270a", 270b", 270c", 271a", 271b", 271c") of FIG. 5 are similar to messages (310, 270a, 270b, 270c, 271a, 271b, 271c) of FIG. 3, respectively.

FIG. 5 shows two additional novel aspects of the invention: the dynamic allocation of a HA 240 and the case of the FA 216 straddling two addressing domains. Dynamic HA allocation is, without loss of generality, undertaken at the FA 216 potentially in conjunction with a policy server. The allocated HA address is then able to be used in selecting the GFA 230 address and the GFA CoA 104b as part of the same allocation procedure. If however the HA allocation is undertaken at the GFA 230 then only the GFA CoA 104b can be dynamically allocated based on the HA address 240 because of the GFA 230 will have be allocated at the FA 216 without knowledge of the yet to be assigned HA 240. Assuming the HA address is allocated at the FA 216, and having established the GFA 230, then the FA 216 needs to pass to the GFA 230 in message 270b" the HA address in the Home Agent IP Address extension (HAIPext), or in a HFAIPext which includes flags or other indicators to differentiate between different types of addresses. The GFA 230 on receiving this HA address is then able to direct message 270c" to that identified HA address. The HA address is already returned to the MN 262 in the standard MIP RREP so the HAIPext is not needed to be included in messages 271".

The second aspect of FIG. 5 is the addition of addressing domain 3 5207 between the MN 262 and the FA 216, such that the address included in message 310" is now the FA address from domain 3 5207, and the FA 216 must then dynamically allocate a FA CoA from domain 1 5201 for inclusion in message 270b" to facilitate the building of a MIP tunnel between the GFA 230 and the FA CoA at FA 216. This is a second example of the applicability of FIG. 1, where the MN 262 is the downstream node 102, the GFA 230 is the upstream node 106, and the FA 216 is the intermediate node 104 with FA address 104a' from domain 3 and FA CoA 104b' from domain 1 5201. Process 130 is then the tunnel construction between the GFA 230 and the FA 216.

The steps and signaling of FIG. 5 are described below. In step 501, for movement detection purposes, FA 216 advertises to MN 262 the FA address from domain 3 5207 and the GFA address from domain 1 5201 via FAA message 310" including FA+GFA address. The subsequent messaging of FIG. 5 is triggered when the MN 262 receives message 310" from FA 216. In step 503, MN 262 issues RREQ message 270a" to FA 216 with a blank CoA field because the GFA CoA is not yet known. Next, in step 505, FA 216 dynamically assigns from domain 1 5201, potentially with AAA support, a FA CoA to the MN 262, and dynamically assigns from domain 2 5203, potentially with AAA support, a HA 240 to the MN 262. Then, FA 216 sends RREQ message 270b" including HA address in HAIPext to GFA 230. Upon reception of message 230, in step 507, GFA 230 forwards the RREQ to HA 240 in RREQ message 270c". In step 509, HA 240 sends RREP message 271a" to GFA 230 so that the MN 262 can ultimately learn the HA address from the RREP. Proceeding to step 511, GFA 230 forwards RREP via message 271b" to FA 216. Then, in step 513, FA 216 signs with an MN-FA shared secret, and then returns the dynamically assigned FA CoA to the MN 262 via RREP message 271c" including FA CoA in HFAext. Finally, in step 515, MN 262 retrieves from RREP message 271c" the FA CoA for use in the CoA field of Regional Registration and the HA address for use in subsequent RREQ messages to the HA 240.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

The above described methods and apparatus are exemplary. Numerous variations are possible while keeping within the scope of the invention.

What is claimed is:

1. A method of supporting disparate addressing plans in a wireless communication system, comprising:
receiving, at a downstream node configured to communicate in a first addressing domain, a registration request message from a mobile node visiting the first addressing domain, wherein the registration request message includes an upstream node address of an upstream node in a second addressing domain and an intermediate node downstream address indicator different from an intermediate node downstream address of an intermediate node;
dynamically allocating, at the downstream node, the intermediate node downstream address of the intermediate node to the mobile node in response to receiving the registration request message, wherein the intermediate node has an upstream interface that is reachable from the upstream node;

sending, from the downstream node, a first message including a first header and a first message body, the first header including the dynamically allocated intermediate node downstream address as the destination address of the first message, the first message body including at least one instruction and the dynamically allocated intermediate node downstream address, wherein the at least one instruction is configured to control the upstream node to interact with the intermediate node;

receiving, at the downstream node, a fourth message in response to the upstream node receiving a second message generated by the intermediate node based on the first message and the upstream node replying with a third message, the fourth message including a fourth message body that includes the dynamically allocated intermediate node downstream address and a dynamically allocated intermediate node upstream address used by the upstream node in invoking the at least one instruction, wherein the dynamically allocated intermediate node upstream address is in the second addressing domain; and forwarding the dynamically allocated intermediate node downstream address and the dynamically allocated intermediate node upstream address to the mobile node.

2. The method of claim 1, wherein receiving the registration request message including the intermediate node downstream address indicator further comprises receiving a blank field, or receiving a default intermediate node downstream address that acts as a common identifier for the dynamically allocated intermediate node downstream address.

3. The method of claim 2, further comprising advertising the default intermediate node downstream address to the mobile node.

4. The method of claim 1, wherein the dynamically allocated intermediate node downstream address is not reachable from the upstream node.

5. The method of claim 1, further comprising dynamically allocating, at the downstream node, the dynamically allocated intermediate node upstream address.

6. The method of claim 1, wherein the dynamically allocated intermediate node upstream address is dynamically allocated by the intermediate node from a selected interface that is reachable from the upstream node.

7. The method of claim 1, wherein the dynamically allocated intermediate node upstream address is requested from an external policy server.

8. The method of claim 1, further comprising dynamically selecting the intermediate node based on at least one of information about a type of communications process corresponding to the at least one instruction, information about the mobile node, information about a location of the mobile node, and information about a type and location of the upstream node.

9. The method of claim 1, wherein the at least one instruction is an instruction to invoke a tunnel between the upstream node and the intermediate node.

10. The method of claim 1, wherein the downstream node is a Mobile IP (MIP) foreign agent, the upstream node is a MIP home agent, and the intermediate node is a Gateway Foreign Agent, wherein the at least one instruction is an instruction used to control construction of a MIP tunnel between the MIP Home Agent and the Gateway Foreign Agent, wherein the registration request message comprises a MIP registration request, and wherein the third message comprises a registration reply message.

11. A non-transitory machine readable medium embodying machine executable instructions for supporting disparate addressing plans in a wireless communication system, comprising:

at least one instruction for receiving, at a downstream node configured to communicate in a first addressing domain, a registration request message from a mobile node visiting the first addressing domain, wherein the registration request message includes an upstream node address of an upstream node in a second addressing domain and an intermediate node downstream address indicator different from an intermediate node downstream address of an intermediate node;

at least one instruction for dynamically allocating the intermediate node downstream address of the intermediate node to the mobile node in response to receiving the registration request message, wherein the intermediate node has an upstream interface that is reachable from the upstream node;

at least one instruction for sending, from the downstream node, a first message including a first header and a first message body, the first header including the dynamically allocated intermediate node downstream address as the destination address of the first message, the first message body including at least one instruction and the dynamically allocated intermediate node downstream address, wherein the at least one instruction included in the first message body is configured to control the upstream node to interact with the intermediate node;

at least one instruction for receiving a fourth message in response to the upstream node receiving a second message generated by the intermediate node based on the first message and the upstream node replying with a third message, the fourth message including a fourth message body that includes the dynamically allocated intermediate node downstream address and a dynamically allocated intermediate node upstream address used by the upstream node in invoking the at least one instruction included in the first message body, wherein the dynamically allocated intermediate node upstream address is in the second addressing domain; and at least one instruction for forwarding the dynamically allocated intermediate node downstream address and the dynamically allocated intermediate node upstream address to the mobile node.

12. A downstream node for supporting disparate addressing plans in a wireless communication system, comprising:

means for receiving, at the downstream node configured to communicate in a first addressing domain, a registration request message from a mobile node visiting the first addressing domain, wherein the registration request message includes an upstream node address of an upstream node in a second addressing domain and an intermediate node downstream address indicator different from an intermediate node downstream address of an intermediate node;

means for dynamically allocating the intermediate node downstream address of the intermediate node to the mobile node in response to receiving the registration request message, wherein the intermediate node has an upstream interface that is reachable from the upstream node;

means for sending, from the downstream node, a first message including a first header and a first message body, the first header including the dynamically allocated intermediate node downstream address as the destination address of the first message, the first message body including at least one instruction and the dynamically allocated intermediate node downstream address, wherein the at least one instruction is configured to control the upstream node to interact with the intermediate node;

means for receiving a fourth message in response to the upstream node receiving a second message generated by the intermediate node based on the first message and the upstream node replying with a third message, the fourth message including a fourth message body that includes the dynamically allocated intermediate node downstream address and a dynamically allocated intermediate node upstream address used by the upstream node in invoking the at least one instruction, wherein the dynamically allocated intermediate node upstream address is in the second addressing domain; and means for forwarding the dynamically allocated intermediate node downstream address and the dynamically allocated intermediate node upstream address to the mobile node.

13. A downstream node for supporting disparate addressing plans in a wireless communication system, comprising:

a receiver configured to receive, at the downstream node configured to communicate in a first addressing domain, a registration request message from a mobile node visiting the first addressing domain, wherein the registration request message includes an upstream node address of an upstream node in a second addressing domain and an intermediate node downstream address indicator different from an intermediate node downstream address of an intermediate node;

a processor configured to dynamically allocate the intermediate node downstream address of the intermediate node to the mobile node in response to receiving the registration request message, wherein the intermediate node has an upstream interface that is reachable from the upstream node;

a transmitter configured to send, from the downstream node, a first message including a first header and a first message body, the first header including the dynamically allocated intermediate node downstream address as the destination address of the first message, the first message body including at least one instruction and the dynamically allocated intermediate node downstream address, wherein the at least one instruction is configured to control the upstream node to interact with the intermediate node;

wherein the receiver is further configured to receive, at the downstream node, a fourth message in response to the upstream node receiving a second message generated by the intermediate node based on the first message and the upstream node replying with a third message, the fourth message including a fourth message body that includes the dynamically allocated intermediate node downstream address and a dynamically allocated intermediate node upstream address used by the upstream node in invoking the at least one instruction, wherein the dynamically allocated intermediate node upstream address is in the second addressing domain; and wherein the transmitter is further configured to forward the dynamically allocated intermediate node downstream address and the dynamically allocated intermediate node upstream address to the mobile node.

14. The downstream node of claim 13, wherein the intermediate node downstream address indicator comprises a blank field, or a default intermediate node downstream address that acts as a common identifier for the dynamically allocated intermediate node downstream address.

15. The downstream node of claim 14, wherein the transmitter is further configured to advertise the default intermediate node downstream address to the mobile node.

16. The downstream node of claim 13, wherein the dynamically allocated intermediate node downstream address is not reachable from the upstream node.

17. The downstream node of claim 13, wherein the processor is further configured to dynamically allocate the dynamically allocated intermediate node upstream address.

18. The downstream node of claim 13, wherein the dynamically allocated intermediate node upstream address is dynamically allocated by the intermediate node from a selected interface that is reachable from the upstream node.

19. The downstream node of claim 13, wherein the dynamically allocated intermediate node upstream address is requested from an external policy server.

20. The downstream node of claim 13, wherein the processor is further configured to dynamically select the intermediate node based on at least one of information about a type of communications process corresponding to the at least one instruction, information about the mobile node, information about a location of the mobile node, and information about a type and location of the upstream node.

21. The downstream node of claim 13, wherein the at least one instruction comprises an instruction to invoke a tunnel between the upstream node and the intermediate node.

22. The downstream node of claim 13, wherein the downstream node is a Mobile IP (MIP) foreign agent, the upstream node is a MIP home agent, and the intermediate node is a Gateway Foreign Agent, wherein the at least one instruction is an instruction used to control construction of a MIP tunnel between the MIP Home Agent and the Gateway Foreign Agent, wherein the registration request message comprises a MIP registration request, and wherein the third message comprises a registration reply message.

* * * * *